Aug. 14, 1945.  F. E. HILLER  2,382,315
ELECTRICAL MEASURING INSTRUMENT
Filed Oct. 31, 1944   2 Sheets-Sheet 1

INVENTOR
FRITZ E. HILLER
BY Seymour, Carle & Nichols
ATTORNEYS

Aug. 14, 1945.　　　F. E. HILLER　　　2,382,315
ELECTRICAL MEASURING INSTRUMENT
Filed Oct. 31, 1944　　　2 Sheets-Sheet 2

INVENTOR
FRITZ E. HILLER
BY Seymour, Earle & Nichols
ATTORNEYS

Patented Aug. 14, 1945

2,382,315

UNITED STATES PATENT OFFICE 2,382,315

ELECTRICAL MEASURING INSTRUMENT

Fritz E. Hiller, Stratford, Conn., assignor to Manning, Maxwell & Moore, Inc., Bridgeport, Conn., a corporation of New Jersey Application October 31, 1944, Serial No. 561,202

6 Claims. (Cl. 171—95)

The present invention relates to improvements in electrical measuring instruments of a type wherein it may be desired to automatically reset an indicator without normally imposing a load thereon. Such electrical instruments may assume a wide variety of forms such, for instance, as ratio-meters and power-factor meters.

One of the objects of the present invention is to provide an electrical measuring instrument with superior means for automatically resetting the indicator thereof upon the disconnection of the instrument, but without interfering with the accurate functioning of the instrument when the same is connected to its circuit.

Another object of the present invention is to provide a superior electrical measuring instrument of the character referred to, and in which the resetting means will remain in its retired or non-interfering position despite wide changes in the applied voltages.

A further object of the present invention is to provide an electrical measuring instrument with superior resetting means which will function as a result of temperature changes incident to the cutting-in or cutting-out of the instrument from its normal electric circuit.

With the above and other objects in view, as will appear to those skilled in the art from the present disclosure, this invention includes all features in the said disclosure which are novel over the prior art and which are not claimed in any separate application.

Figure 1:
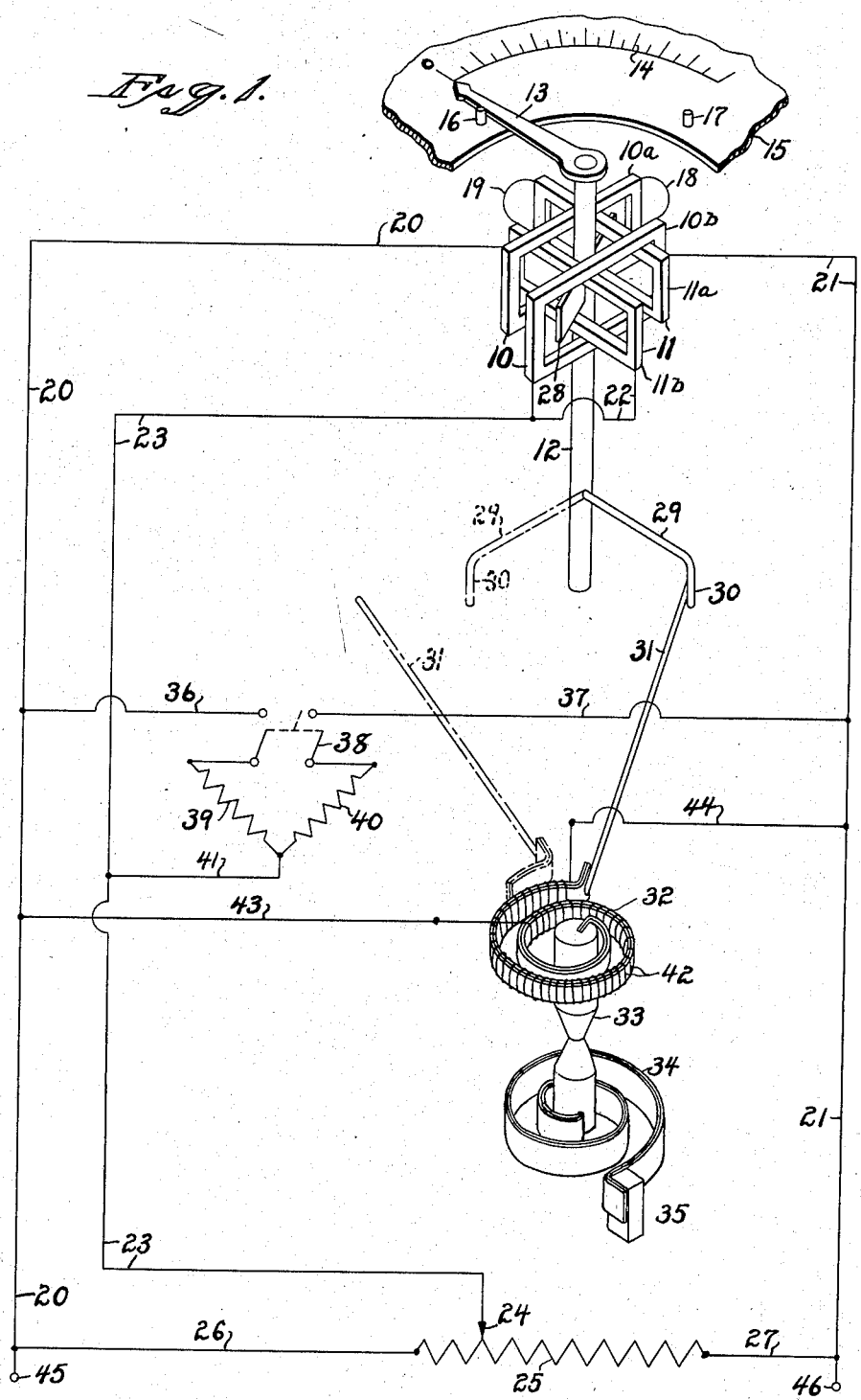
Figure 2:
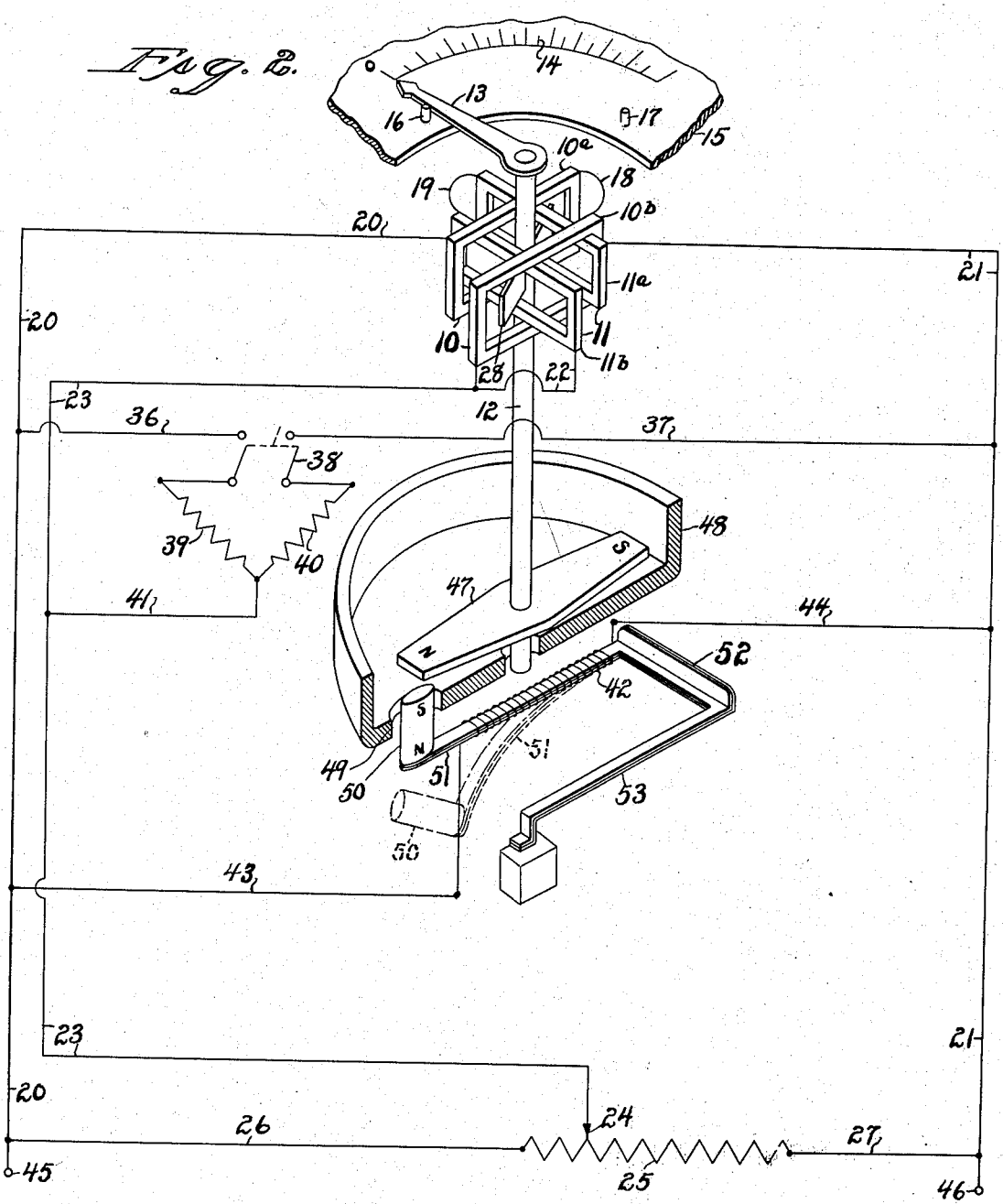

In the accompanying drawings, in which certain modes of carrying out the present invention are shown for illustrative purposes:

Fig. 1 is a schematic view of a ratio-meter in which is embodied one form of the present invention; and Fig. 2 is a similar view illustrating another form of resetting means.

The showing of Fig. 1

The particular electrical measuring instrument illustrated in Fig. 1 for purposes of making clear one form of the present invention, includes two complemental coils 10 and 11 respectively divided into coil-sections 10a—10b and 11a—11b. The coil-sections 10a and 10b extend parallel with each other in laterally spaced apart relationship and are respectively located on opposite sides of a shaft or arbor 12. The coil-sections 11a and 11b of the coil 11 also extend in parallelism with each other on respective opposite sides of the shaft 12, but are obliquely disposed with respect to the coil-sections 10a and 10b.

In the instance shown, the coils 10 and 11 and hence their respective coil-sections 10a—10b and 11a—11b are of rectangular ring-like form and are so arranged that the coil-sections 11a and 11b extend obliquely through the coil-sections 10a and 10b. Thus, the shaft or arbor 12 extends vertically in parallelsm with the faces of the coil-sections 10a—10b and 11a—11b is "enclosed," so to speak, within the substantially rectangular outline provided by the respective central portions of the four coil-sections above referred to.

The shaft 12 may be supported in any suitable bearings (not shown) and is provided at its upper end with a rigid radially extending pointer or indicator 13 adapted to sweep over an arcuate series of indicia 14, which latter are printed or otherwise applied to the surface of a dial plate 15. Adjacent each of the ends of the series of indicia 14, the dial plate 15 is provided with two upstanding stop pins 16 and 17 which are adapted to be engaged by and to limit the movement of the pointer 13.

The coil-sections 10a and 10b of the coil 10 are electrically interconnected as at 18, while the coil-sections 11a and 11b of the coil 11 are similarly inter connected at 19. One terminal of the coil 10 is connected to a line wire 20 which is the complement of a second line wire 21, both of which lead to any suitable source of A. C. or D. C. voltage which it is desired to have applied to the electrical measuring instrument shown.

The remaining terminal of the coil 10 is interconnected by a wire 22 to one of the terminals of the coil 11, and the said wire 22 is connected by means of a wire 23 to the adjustable contact 24 of a resistor 25. The remaining terminal of the coil 11 is, as shown, connected to the line wire 21. The resistor 25 has its opposite terminals respectively connected by wires 26 and 27 to the respective complemental line wires 20 and 21.

The parts 10 to 19 inclusive, above described, compose what is commonly referred to as a "ratio-meter." In the instance shown, therefore, the forces respectively developed by the coils 10 and 11 at any given instant, while variable relative to each other, are however, always such as to oppose each other in their respective efforts to move an armature 28 which is rigid with and extends diametrically with respect to the shaft 12.

Adjacent its lower end, the shaft 12 is provided with a rigid radially projecting arm 29 terminating in an integral finger 30 extending downwardly in substantial parallelism with the said shaft 12. The finger 30 of the arm 29 is adapted to be engaged by the outer portion of a resetting arm 31, in a manner as will more fully hereinafter appear. The said resetting arm 31 is rigidly attached at its inner end to the outer end of a bimetallic thermal element 32 arranged in spiral form and having its inner end rigidly attached to a shaft 33.

The thermal element 32 above referred to, may be of any approved composition not requiring detailed description herein other than to state that the changes in temperature to which it is subjected will cause the said thermal element to distort itself. In the instance shown, the thermal element 32 is so constructed that upon a rise of temperature, its spiral form tends to open up, and conversely, upon a fall in temperature, the said spiral form tends to close in.

Preferably and as shown, the intermediate portion of the shaft 33 is contracted to minimize heat conduction between its respective opposite ends. The said shaft has secured to its lower end, the inner end of a second spiral thermal element 34. The outer end of the thermal element 34 is rigidly attached to a supporting block 35, so that the said thermal element 34 will serve to support the shaft 33, the thermal element 32 and the resetting arm 31.

The thermal element 34 is arranged in opposition with respect to the thermal element 32, i. e., a rise in ambient temperature will cause the said thermal element 34 to expand and turn the shaft 33 in a clockwise direction at the same time that the rise in ambient temperature causes the thermal element 32 to expand and swing the resetting arm in a counterclockwise direction. Conversely, upon a fall in the ambient temperature, the thermal element 34 will effect a commensurate turning of the shaft 33 in a counterclockwise direction, while at the same time the said ambient temperature is causing the thermal element 32 to swing the resetting arm 31 to a similar degree in a clockwise direction.

From the foregoing it will be seen that the thermal element 34 functions to offset or compensate for changes in the thermal element 32 occasioned by changes in ambient temperature. The compensating arrangement referred to permits the heat deliberately applied to the thermal element 32 to function accurately, with substantially no interference from the effects of ambient temperature.

A wire 36 and a wire 37 respectively extend inwardly from the line wires 20 and 21 to the complemental contacts of a double-pole switch 38. The blades of the said switch 38 are respectively connected to the adjacent ends of similar resistance coils 39 and 40, while the opposite terminals of the said coils are connected together and jointly connected by means of a wire 41 to the wire 23 leading to the contact 24 of the resistor 25. The coils 39 and 40 are preferably so constituted that their respective impedances correspond to the impedances of the coils 10 and 11. The said coils 39 and 40 provide a duplicate or "dummy" load. In instances where two ratio-meters or the like would ordinarily be connected to the line wires 20 and 21, the cutting out of one such ratio-meter would be very apt to cause inaccuracies in the ratio-meter which remains connected. To counteract such effect and to enable a single ratio-meter or the like to give accurate indications under the circumstances just above referred to, the dummy load comprising the coils 39 and 40 may be cut into the circuit by closing the switch 38.

Wrapped around the thermal element 32, or otherwise associated therewith in a heat transferring relationship, is a heating coil 42 having one end connected by means of a wire 43 to the line wire 20 and having its opposite end connected by means of a wire 44 to the complemental line wire 21. The said heating coil 42 may be formed of any suitable conducting material such, for instance, as a high resistance nickel-chromium alloy.

Preferably, all of the elements above described would be enclosed within a suitable single case, in which case the so-called "line wires" 20 and 21 would be respectively provided with terminals 45 and 46, to which may be connected suitable wires providing the voltages which are to be applied to the instrument assembly as above described.

Under the conditions shown by full lines in Fig. 1, no voltage is applied across the terminals 45 and 46 and hence the heating coil 42 (and also the coils 10 and 11) will be deprived of energy, so that the convolutions of the spiral thermal element 32 will be closed in and thus maintain the resetting arm 31 in engagement with the finger 30 of the arm 29. In this manner the shaft 12 will be held in a position wherein its pointer 13 is in its zero position (or other desired position) and against the stop pin 16.

As soon as a suitable voltage is applied across the terminals 45 and 46, the heating coil 42 will be energized and the heat which it develops will be transferred to the thermal element 32 to raise the temperature thereof to a predetermined point. The heating of the thermal element 32 will cause its spiral convolutions to open up, thereby swinging the resetting arm 31 from the position in which it is shown in full lines in Fig. 1 into the position in which it is shown by broken lines in the said figure. When the resetting arm 31 is moved as just described, it retires out of the path of movement of the arm 29 and hence leaves the shaft 12 and the parts carried thereby free for turning movement without restraint by the thermal element 32. In this manner the ratio-meter or its equivalent is now free to function accurately and unhindered by the resetting means.

When the voltage applied across the terminals 45 and 46 is cut off, the heating coil 42 will be deprived of energy simultaneously with the ratio-meter or its equivalent. Under these conditions, the thermal element 32 will fall in temperature and will contract and assume substantially the position in which it is shown by full lines in Fig. 1. As the said thermal element 32 contracts as a result of a fall in its temperature, the resetting-arm 31 will be swung from left to right from the position in which it is indicated by broken lines in Fig. 1 into the position in which it is shown by full lines in the said figure, and will thereby engage with the finger 30 of the arm 29 and ultimately shift the same into the position shown by full lines in Fig. 1, to thereby restore the pointer 13 to its retired or other desired position.

The showing of Fig. 2

The apparatus illustrated in Fig. 2 corresponds basically to that shown in Fig. 1 though the parts 29 to 35 inclusive are omitted and replaced by an alternative thermal-resetting device.

Instead of being provided with an arm such as 29, the lower portion of the shaft or arbor 12 is provided with a bar magnet 47 preferably formed of permanent magnet material and located within an upwardly opening cup-shaped shield 48. The bottom wall of the shield 48 is formed with a clearance opening 49 through which is adapted to be projected and retired a bar magnet 50 also preferably formed of permanent magnet material.

The lower end of the bar magnet 50 is rigidly attached to one arm 51 of a bimetallic thermal element generally designated by the reference character 52. The said thermal element 52 also includes a second arm 53 laterally spaced from and extending in parallelism with the arm 51. The arm 53 may be utilized as a mounting arm for the thermal element 52 if desired. The heating coil 42 is wrapped around the arm 51 of the said thermal element 52 as shown.

Normally, when no voltage is applied across the terminals 45 and 46, the arm 51 of the bimetallic thermal element 52 will assume substantially the position in which it is shown by full lines in Fig. 2. In the position just referred to, it will be noted that the upper end of the bar magnet 50 is projected upwardly through the clearance opening 49 in the non-magnetic shield 48, so as to be in position to attract and magnetically hold the end of the bar magnet 47 which is of unlike polarity with respect to the polarity of the upper end of the bar magnet 50. Under the conditions just described, the shaft 12 will be held in position wherein its pointer 13 has a zero or other desired position.

Now when a suitable voltage is applied across the terminals 45 and 46 to energize the coils 10 and 11, the heating coil 42 will be coincidentally energized, with the effect of heating the arm 51 of the bimetallic thermal element 52. As the temperature of the arm 51 rises, the said arm will distort itself and retire the bar magnet 50 downwardly (as indicated by broken lines) to a sufficient degree to have substantially no influence on the bar magnet 47 of the shaft 12. Thus, in a very brief interval following the application of a suitable voltage across the terminals 45 and 46, the shaft 12 and the parts carried thereby will be relieved of restraint and will be free to respond to the opposing forces provided by the coils 10 and 11 or other suitable electrical actuating means.

When the instrument is cut off from the circuit to which its terminals 45 and 46 have been previously connected, the arm 51 of the thermal element 52 will cool and reassume the position in which it is shown by full lines in Fig. 2. Under these conditions, the upper end of the bar magnet 50 will attract the pole of the bar magnet 47 which is opposite in polarity, and thereby restore indicator or pointer 13 and the parts associated therewith into the positions in which they are shown by full lines in Fig. 2. At the time of the rise of the bar magnet 50 as just described, should the opposite or like pole of the bar magnet 47 be nearer the upper end of the bar magnet 50, repulsion will take place between the said unlike poles in a direction required to reset the indicator 13, following which the attraction between the unlike poles of the bar magnet 50 and the bar magnet 47 will complete the resetting.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. An electrical measuring instrument, including in combination: an indicator; electrical actuating means for deflecting the said indicator; a heat distortable thermal element; electrical heating means associated with the said thermal element in heat-exchange relationship with respect thereto; connecting means electrically interconnecting the said electrical heating means and the said electrical actuating means to provide for the concurrent energization of both thereof; and resetting means operatively connected to the said heat distortable thermal element to be moved thereby and constructed and arranged to reset the said indicator into a predetermined position when the temperature of the said thermal element falls as a result of the said heating means being deprived of energy, and to move into a retired position when the temperature of the said thermal element rises as a result of the concurrent application of electrical energy to the said heating means and the said electrical actuating means.

2. An electrical measuring instrument, including in combination: an indicator shaft; an indicator carried by the said indicator shaft; electrical actuating means for turning the said indicator shaft to deflect the said indicator; a heat distortable thermal element; electrical heating means associated with the said thermal element in heat-exchange relationship with respect thereto; a first resetting abutment carried by the said indicator shaft; a second resetting abutment operatively connected to the said thermal element for being moved thereby; the said thermal element being constructed and arranged to move the said second resetting abutment into engagement with the said first resetting abutment of the said indicator shaft when the temperature of the said thermal element falls as the result of the said heating means being deprived of energy, and to move the said second resetting abutment into a retired position when the temperature of the said thermal element rises as a result of the application of electrical energy to the said heating means; and connecting means electrically interconnecting the said electrical heating means and the said electrical actuating means to provide for the concurrent energization of both thereof.

3. An electrical measuring instrument, including in combination: an indicator; electrical actuating means for deflecting the said indicator; a heat distortable thermal element of spiral form; electrical heating means associated with the said thermal element in heat-exchange relationship with respect thereto; connecting means electrically interconnecting the said electrical heating means and the said electrical actuating means to provide for the concurrent energization of both thereof; and resetting means operatively connected to the said spiral thermal element to be moved thereby and constructed and arranged to reset the said indicator into a predetermined position when the temperature of the said spiral thermal element falls as a result of the said heating means being deprived of energy, and to move into a retired position when the temperature of the said spiral thermal element rises as a result of the concurrent application of electrical energy to the said heating means and the said electrical actuating means.

4. An electrical measuring instrument, including in combination: an indicator shaft; an indicator carried by the said indicator shaft; electrical actuating means for turning the said indicator shaft to deflect the said indicator; a heat distortable thermal element of spiral form; electrical heating means associated with the said spiral thermal element in heat-exchange relationship with respect thereto; a first resetting abutment carried by the said indicator shaft; a second resetting abutment operatively connected to the said spiral thermal element for being moved thereby; the said spiral thermal element being constructed and arranged to move the said second resetting abutment into engagement with the said first resetting abutment of the said indicator shaft when the temperature of the said spiral thermal element falls as the result of the said heating means being deprived of energy, and to move the said second resetting abutment into a retired position when the temperature of the said spiral thermal element rises as a result of the application of electrical energy to the said heating means; and connecting means electrically interconnecting the said electrical heating means and the said electrical actuating means to provide for the concurrent energization of both thereof.

5. An electrical measuring instrument, including in combination: an indicator; electrical actuating means for deflecting the said indicator; a heat distortable thermal element of spiral form; spring means connected to one end of the said spiral thermal element to yieldingly anchor the same; electrical heating means associated with the said spiral thermal element in heat-exchange relationship with respect thereto; connecting means electrically interconnecting the said electrical heating means and the said electrical actuating means to provide for the concurrent energization of both thereof; and resetting means operatively connected to a portion of the said spiral thermal element which is opposite the said spring means to be moved thereby and constructed and arranged to reset the said indicator into a predetermined position when the temperature of the said spiral thermal element falls as a result of the said heating means being deprived of energy, and to move into a retired position when the temperature of the said spiral thermal element rises as a result of the concurrent application of electrical energy to the said heating means and the said electrical actuating means.

6. An electrical measuring instrument, including in combination: an indicator; electrical actuating means for deflecting the said indicator; a heat distortable thermal element; electrical heating means associated with the said thermal element in heat-exchange relationship with respect thereto; connecting means electrically interconnecting the said electrical heating means and the said electrical actuating means to provide for the concurrent energization of both thereof; resetting means operatively connected to the said heat distortable thermal element to be moved thereby and constructed and arranged to reset the said indicator into a predetermined position when the temperature of the said thermal element falls as a result of the said heating means being deprived of energy, and to move into a retired position when the temperature of the said thermal element rises as a result of the concurrent application of electrical energy to the said heating means and the said electrical actuating means; and a second thermal element operatively connected to the first said thermal element and constructed and arranged to substantially compensate the same for distortions due to changes in ambient temperatures.

FRITZ E. HILLER.